N. W. McLEOD.
METHOD OF MAKING PNEUMATIC TIRE CASINGS.
APPLICATION FILED NOV. 13, 1911.
1,029,307.
Patented June 11, 1912.
3 SHEETS—SHEET 1.
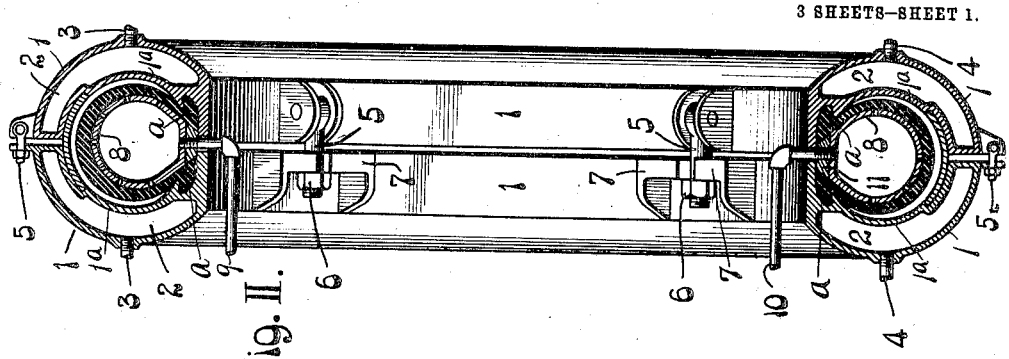
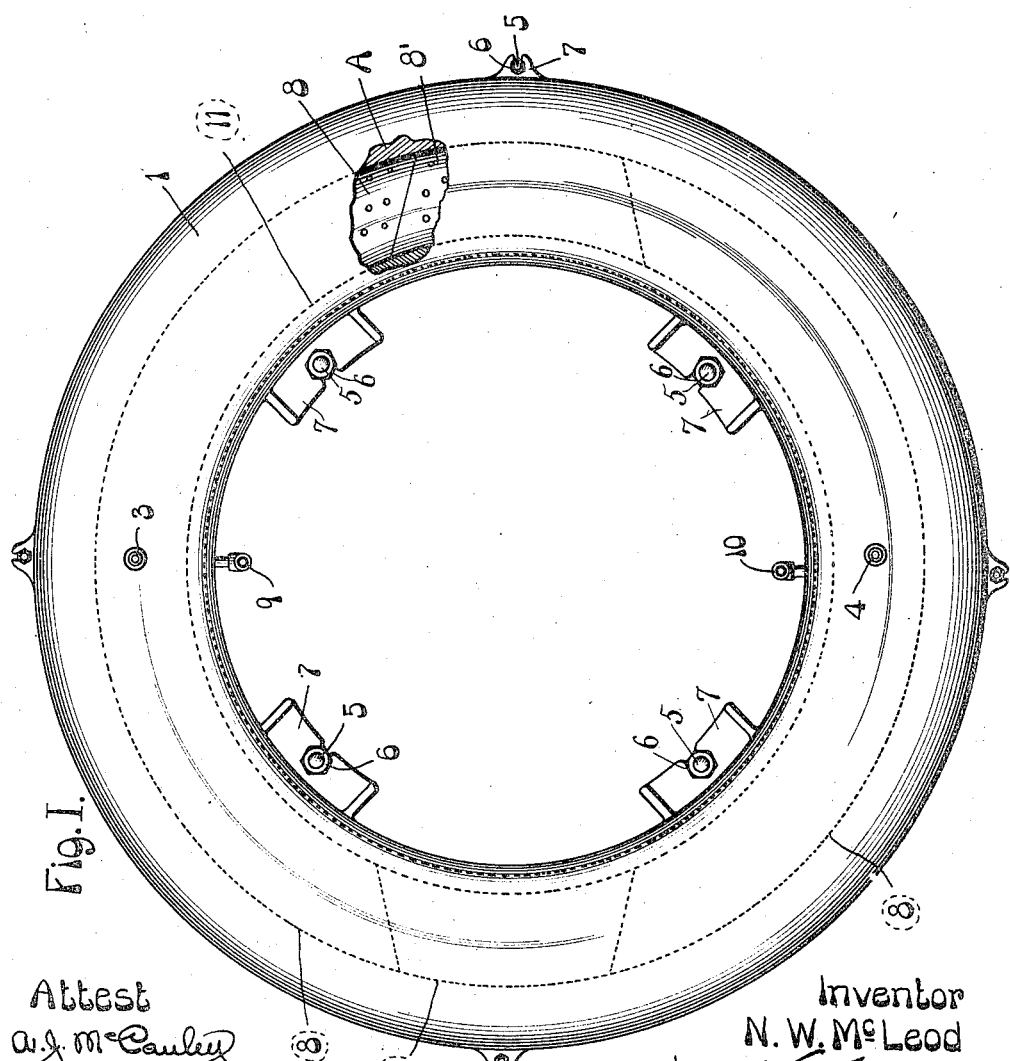
Attest
a. J. McCauley
E. B. Linn
Inventor
N. W. McLeod
by Knight & Cook
Attys.

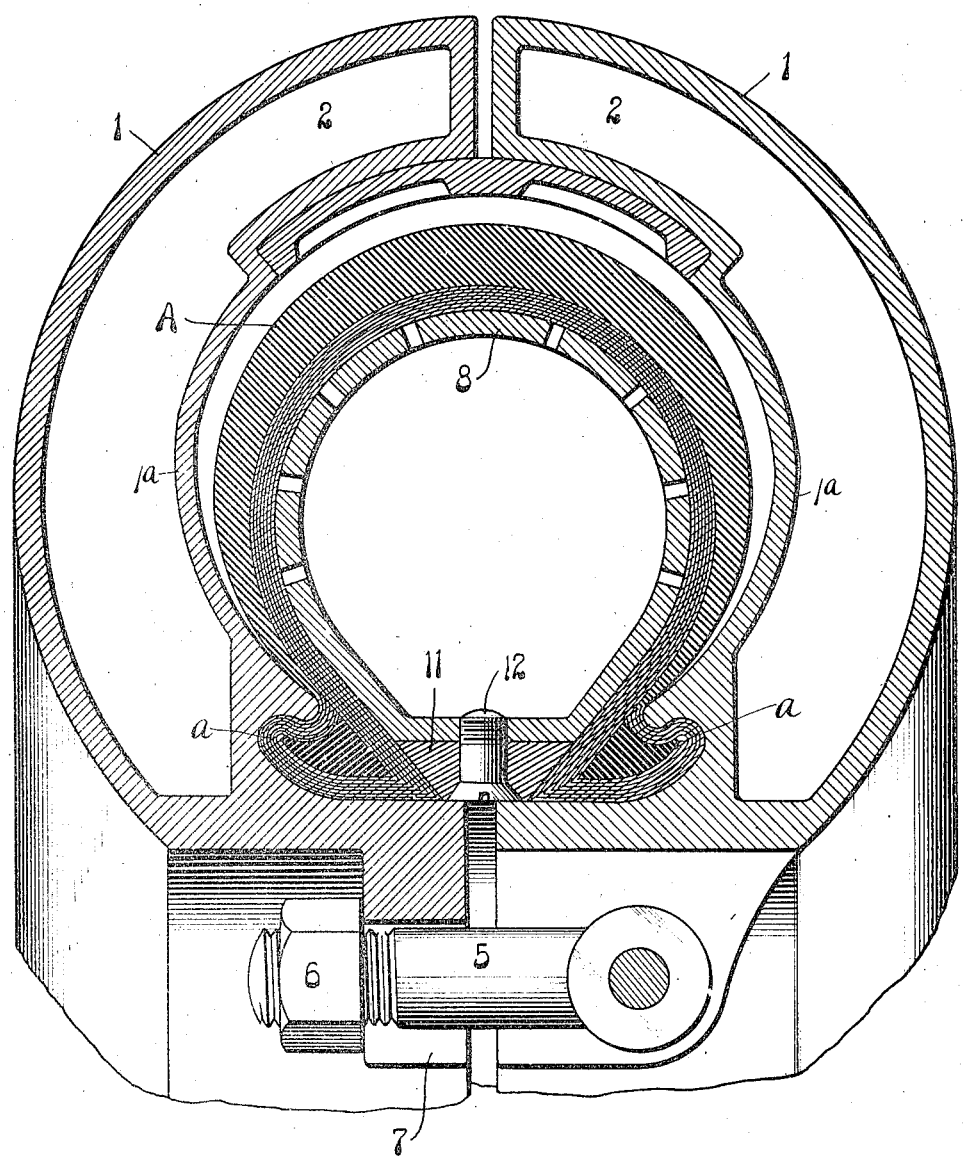

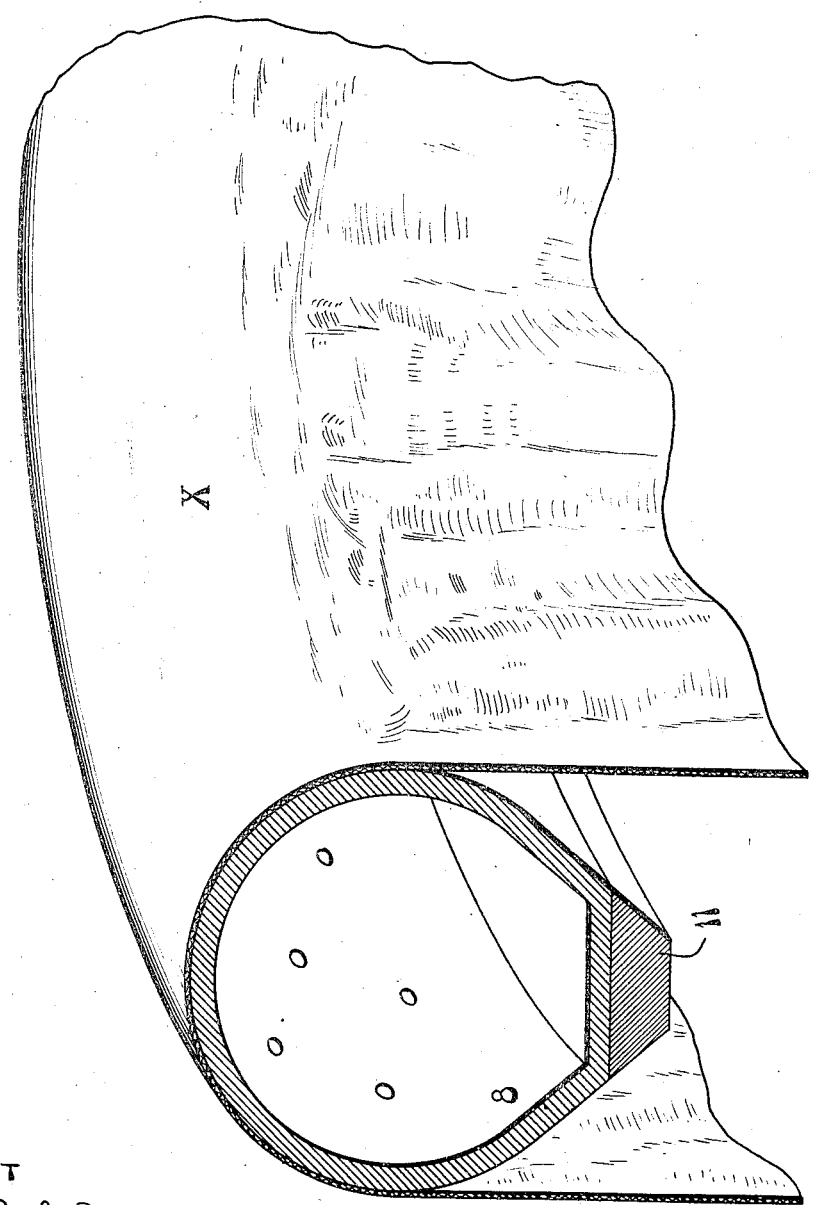

UNITED STATES PATENT OFFICE.

NELSON W. McLEOD, OF ST. LOUIS, MISSOURI, ASSIGNOR TO AMERICAN TIRE COMPANY, OF ST. LOUIS, MISSOURI, A CORPORATION.

METHOD OF MAKING PNEUMATIC-TIRE CASINGS.

1,029,307.   Specification of Letters Patent.   Patented June 11, 1912.

Application filed November 13, 1911. Serial No. 660,027.

*To all whom it may concern:*

Be it known that I, NELSON W. McLEOD, a citizen of the United States of America, and a resident of the city of St. Louis, in the State of Missouri, have invented certain new and useful Improvements in the Method of Making Pneumatic-Tire Casings, of which the following is a full, clear, and exact description, reference being had to the accompanying drawings, forming part of this specification.

My invention relates to a method of making pneumatic tire casings open at their inner circumferences and within which air inflated tubes are used, the invention having for its object the carrying out of a method by virtue of which the structures of the casings are rendered much stronger and more durable than similar casings made in accordance with the usual methods at present in vogue.

Cross reference is made to the application of Mark A. Dees and Nelson W. McLeod, filed April 5, 1912, Serial Number 688,607, for the tire vulcanizing mold described and shown but not claimed herein and to the application of Nelson W. McLeod, filed May 10, 1912, Serial Number 696,292, for the pneumatic tire casing described and shown but not claimed herein.

One of the most essential elements of a pneumatic tire casing is a strength giving skeleton of canvas, or other suitable fabric. In making pneumatic casings that are open at their inner circumferences, the fabric is commonly cut diagonally of its mesh, producing strips of desirable widths, which are stretched layer upon layer circumferentially of a suitable annular mandrel, causing both the warp and woof to be placed under tension at the periphery of the tire casing structure. The fabric strips are made of sufficient width to extend laterally for incorporation into the sides of the tire casing structure, and it will be apparent that, inasmuch as the tire structure diminishes in diameter from its outer to its inner circumference, the lateral portions of the fabric strips must be condensed to produce smooth sides in the tire structure. Due to the necessary condensation in the side portions, the threads therein are compacted, without being placed under tension, as they are at the periphery of the structure, and do not uniformly carry their proper individual proportions of stress and strain when the tire casing is subjected to inner tube pressure in service. Furthermore the threads in the unstretched or condensed sides of the casing structure, by yielding in response to the inner tube pressure, create a stretching action upon the rubber in the mesh of the fabric. Obviously, therefore, opportunity is afforded for the inner tube pressure creating a distortion of the rubber and rupture of the casing.

The purpose of my present invention is the carrying out of a method by which the faults mentioned are overcome. With this in view, my method contemplates certain steps in the manufacture of a tire casing, by virtue of which such casing will be produced with its component parts adjusted and set in the relation to each other that they will occupy when an inner tube of the tire has been inflated therein.

In preparing a tire casing up to the point where my method is utilized, the skeleton fabric, treated with raw rubber, is built up to produce a raw tire casing of a description, for instance, such as I have set forth.

The raw or uncooked tire casing is placed in a vulcanizing mold, the chamber of which is somewhat larger in cross sectional dimensions than the cross section of the tire casing structure, so as to leave a free space between the outer face of the casing and the internal face of the mold. While the raw rubber is pliable and has little or no elasticity, fluid under pressure is introduced into the tire casing to stretch the fabric skeleton uniformly, causing the raw rubber to be pressed to the inner face of the external mold. The degree of pressure made use of is equal to or greater than the inner tube pressure to which the tire casing will be subjected when in service, and particular attention is directed to the fact that the fluid pressure applied to the casing is exerted with equal and uniform force in all directions. All of the skeleton fabric threads are, therefore, adjusted and placed under an equal degree of tension to, approximately, the limit of elasticity of the threads at a time when they are free to yield in the raw rubber. After the stretching operation, the rubber is vulcanized while the fabric threads are under uniform tension, the vulcanization being preferably accomplished by the use of hot fluid under pressure applied, at least in part, to the interior of the tire casing. The internal pressure medium applied to the interior of the tire casing during the vulcanizing process is preferably steam, which may also be used for the stretching action; and the external mold may also be heated by steam.

When the tire casing is vulcanized, the fabric threads are set in their stretched condition which they have freely assumed in response to internal fluid pressure while free to yield in the raw rubber, and when the casing is afterward subjected to the pressure of the inflated tube of a tire, all of the threads will act in unison to resist the tube pressure. This is not true of tire casings constructed by the old methods which produced casings reinforced by fabric having stretched portions and condensed unstretched portions.

Figure I is a side elevation partly in section of a mold adapted to be used in carrying out my method. Fig. II is a cross section of the mold. Fig. III is an enlarged cross section of the mold. Fig. IV is a perspective view showing a portion of a mandrel and a layer of fabric stretched centrally, leaving the loose lateral portions that must be condensed.

In carrying out my method, I preferably make use of the mold illustrated in the accompanying drawings, in which:

1 designates the outer or shell sections of my mold. These sections are in the form of hollow rings, each section being of segmental shape in cross section. Each section 1 has a concave inner wall 1ª corresponding to a cross sectional segment of a pneumatic tire casing, preferably including the usual beads a at the inner edges of such a tire casing. Each outer mold section contains one or more chambers 2 into which a heating medium, such as steam, may be delivered and discharged by passage through pipes 3 and 4. The shell sections are designed to be drawn toward each other by any suitable means; such, for instance, as the draw bolts 5 pivoted to one of the shell sections and nuts 6 that engage slotted lugs 7 on the other shell section.

Centrally arranged within the shell sections is a plurality of hollow sections 8 and 8′, which, when placed with their ends in abutment, produce a hollow annular mandrel corresponding in shape to the shape of the interior of a pneumatic tire casing. This mandrel is preferably made of sections to permit of its being readily arranged within the tire casing A and readily withdrawn from such casing after the casing has been molded and vulcanized. The mandrel sections are perforated, as shown, to permit the passage of fluid therethrough to the surrounding casing. In this connection, it should be stated that the mandrel and the inner faces of the shell sections are spaced apart, relative to each other, to a degree greater than the cross section of the tire casing that is to be molded, thereby making it possible for the tire casing to be expanded or stretched outwardly from the mandrel, when it is acted upon by the pressure medium. The admission and discharge of fluid pressure medium to and from the mandrel of the mold is provided for by pipes 9 and 10.

At the inner circumference of the mandrel is an endless packing ring 11 held to the mandrel sections by screws 12. The packing ring seats between the inner edges of the tire casing A and is tightly clamped thereto when the shell sections are drawn together to confine the tire casing. This packing ring is preferably made with sloping sides corresponding to the shape of the inner faces of the tire casing adjacent its edges, and when the inner edges of the tire casing are tightly clamped to said ring by the closure of the mold, escape of fluid pressure medium between the mandrel and the inner edges of the tire casing is effectually prevented.

The first step in forming a tire casing is to wrap strips X of fabric coated and filled with raw rubber around the periphery of the mandrel, and at the same time stretch said fabric to cause its middle portion to conform to the shape of the periphery of the mandrel, as seen in Fig. IV. The loose fabric at the sides of the mandrel is then condensed or contracted, by pressure applied by milling tools or other implements that act to smooth the fabric by adjustment of its threads. Any desired number of layers of fabric may be wound around the mandrel, and each layer is pressed around the sides of the mandrel so as to present an absolutely smooth surface conforming to the configuration of the mandrel. No wrinkles are then present in the fabric, all looseness being apparently eliminated, due to condensation of the threads of the fabric strips at the sides of the mandrel. If the tire is intended to be of the clencher type, the edges of the fabric are provided with or shaped to form beads for holding the tire onto a wheel rim. The fabric is then covered with raw rubber and placed in the mold sections 1, the outer face of the raw rubber being at this time spaced some distance away from the inner face of the mold sections, as seen in Fig. III. The next step is the introduction of fluid pressure into the perforated hollow mandrel, and to prevent permeation of fluid into the structure, any suitable medium may be utilized. The internal fluid pressure stretches the fabric, places the fabric threads under tension to, approximately, the limit of the elasticity of the threads, and causes the raw rubber to engage the inner face of the external mold. The fabric threads are therefore adjusted in the raw rubber to the positions they will tend to assume when in service, and it is to be noted that all of the threads will be subjected to the same degree of tension. The degree of pressure required for this operation is preferably equal to or greater than the degree of internal pressure from the inner tube of a tire, and it must necessarily follow that the threads will not yield when subjected to the inner tube pressure. After the fabric is stretched in the raw rubber by my method, a high degree of fluid pressure is maintained at the interior of the tire casing, throughout the period in which the casing is being vulcanized.

I claim:

1. The method of making pneumatic tire casings, which consists in forming a casing structure of fabric and raw rubber, thereafter placing the threads of said fabric under uniform tension to, approximately, the limit of the elasticity of the threads by applying pressure internally of said structure, and finally vulcanizing said structure whereby the threads are set in their stretched condition.

2. The method of making pneumatic tire casings, which consists in forming a casing structure of fabric and raw rubber, thereafter placing the threads of said fabric under uniform tension to, approximately, the limit of the elasticity of the threads by applying fluid pressure internally of said structure, and finally vulcanizing said structure whereby the threads are set in their stretched condition.

3. The method of making pneumatic tire casings, which consists in forming a casing structure of fabric and raw rubber, placing the threads of said fabric under uniform tension to, approximately, the limit of the elasticity of the threads by applying pressure internally of said structure, and finally vulcanizing the structure while the fabric threads are under uniform tension whereby the threads are set in their stretched condition.

4. The method of making pneumatic tire casings, which consists in forming a casing structure of fabric and raw rubber, thereafter subjecting such structural elements to a uniform pressure applied internally of the structure whereby the threads of the fabric are placed under uniform tension to, approximately, the limit of the elacticity of the threads, holding said threads under uniform tension, and finally vulcanizing the structure while the threads are under uniform tension whereby the threads are set in their stretched condition.

5. The method of making tire casings which consists in forming a casing structure of fabric and raw rubber laid around the periphery of an annular mandrel, condensing the portions of said fabric at the sides of said mandrel, thereafter placing the threads of said fabric under uniform tension to, approximately, the limit of the elasticity of the threads by pressure applied internally of said structure, and vulcanizing said structure during a continuation of pressure against said structure from the interior thereof whereby the threads are set in their stretched condition.

6. The method of making tire casings of fabric and raw rubber which consists in stretching the fabric around the periphery of an annular mandrel, condensing portions of said fabric at the sides of said mandrel, thereafter placing the threads of said fabric under uniform tension to, approximately, the limit of the elasticity of the threads by pressure applied internally of said structure, and finally vulcanizing said casing while the fabric threads are under uniform tension whereby the threads are set in their stretched condition.

7. The method of making tire casings of fabric and raw rubber which consists in stretching the fabric around the periphery of an annular mandrel, condensing portions of said fabric at the sides of said mandrel, thereafter placing the threads of said fabric under uniform tension to, approximately, the limit of the elasticity of the threads by fluid pressure applied internally of said structure, and finally vulcanizing said casing while the fabric threads are under uniform tension whereby the threads are set in their stretched condition.

8. The method of making tire casings, which consists in forming a casing structure of layers of fabric and raw rubber in which the weave of the fabric is arranged diagonally of the circumference of the casing structure, thereafter placing the threads of said fabric under uniform tension to, approximately, the limit of the elasticity of the threads by pressure applied internally of said structure, and finally vulcanizing said structure while the threads of the fabric are under uniform tension whereby the threads are set in their stretched condition.

9. The method of making tire casings, which consists in forming a casing structure of layers of fabric and raw rubber in which the weave of the fabric is arranged diagonally of the circumference of the casing structure, thereafter placing the threads of said fabric under uniform tension to, approximately, the limit of the elasticity of the threads by fluid pressure applied internally of said structure, and finally vulcanizing said structure while the threads of the fabric are under uniform tension whereby the threads are set in their stretched condition.

10. The method of making tire casings, which consists in forming a casing structure of fabric and raw rubber, placing said structure within a mold having a mold cavity of greater diameter than the diameter of the casing structure when in an expanded but unstretched condition, introducing a pressure medium into said casing structure to stretch the fabric therein and place the fabric threads under uniform tension to, approximately, the limit of elasticity of the threads, and finally vulcanizing the structure while the fabric threads are under uniform tension, whereby the threads are set in their stretched condition.

11. The method of making pneumatic tire casings, which consists in wrapping strips of fabric, coated and filled with raw rubber, around the periphery of a mandrel and at the same time stretching said fabric so as to cause the middle portion to conform to the shape of the periphery of the mandrel, then condensing or contracting the fabric at the sides of the mandrel by pressure so as to smooth the fabric by the adjustment of its threads and repeating the operation until sufficient layers are applied, covering the built up fabric with raw rubber, applying pressure within the structure so as to stretch the threads of the fabric to, approximately, the limit of the elasticity of the threads and finally vulcanizing said structure whereby the threads are set in their stretched condition.

NELSON W. McLEOD.

In the presence of—
A. J. McCauley,
Edna B. Linn.